United States Patent
Hsu et al.

(10) Patent No.: US 9,582,872 B2
(45) Date of Patent: Feb. 28, 2017

(54) OPTICAL FILM DEFECT DETECTION METHOD AND SYSTEM THEREOF

(71) Applicant: Yuan Ze University, Taoyuan (TW)

(72) Inventors: Chia-Yu Hsu, New Taipei (TW);
Shih-En Jhong, Tainan (TW);
Kuo-Hua Lai, Taoyuan (TW);
Chien-Lung Chan, Taoyuan (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 0 days.

(21) Appl. No.: 14/966,479

(22) Filed: Dec. 11, 2015

(65) Prior Publication Data
US 2017/0004612 A1   Jan. 5, 2017

(30) Foreign Application Priority Data

Jul. 3, 2015 (TW) .............................. 104121760 A

(51) Int. Cl.
*G06K 9/00* (2006.01)
*G06T 7/00* (2006.01)
*G06K 9/46* (2006.01)

(52) U.S. Cl.
CPC .......... *G06T 7/0004* (2013.01); *G06K 9/4647* (2013.01)

(58) Field of Classification Search
CPC .................. G06T 7/001; G06T 7/0004; G06T 2207/30148; G06T 2207/30164; G01N 21/88
See application file for complete search history.

(56) References Cited

U.S. PATENT DOCUMENTS

| | | | | |
|---|---|---|---|---|
| 4,998,209 A * | 3/1991 | Vuichard | ............... | B25J 9/1697 |
| | | | | 348/673 |
| 6,912,089 B2 * | 6/2005 | Nakagawa | ........... | G02B 5/0226 |
| | | | | 359/453 |
| 7,453,422 B2 * | 11/2008 | Park | ...................... | G09G 3/2022 |
| | | | | 315/169.4 |
| 7,851,753 B2 * | 12/2010 | Uto | .................. | G01N 21/95607 |
| | | | | 250/306 |
| 8,211,253 B2 * | 7/2012 | Yura | ................... | B32B 38/1833 |
| | | | | 156/360 |
| 8,711,085 B2 * | 4/2014 | Ward | .................... | G09G 3/3413 |
| | | | | 345/102 |
| 9,325,948 B2 * | 4/2016 | Ma | ......................... | G09G 3/3466 |
| 2006/0132659 A1 * | 6/2006 | Kimura | ..................... | G09G 3/20 |
| | | | | 348/631 |
| 2015/0097944 A1 * | 4/2015 | Palm | ...................... | G01N 25/72 |
| | | | | 348/129 |

* cited by examiner

*Primary Examiner* — Amir Alavi
(74) *Attorney, Agent, or Firm* — Muncy, Geissler, Olds & Lowe, P.C.

(57) ABSTRACT

An optical defect detection method and a system thereof are disclosed. The detection method includes a process of detecting an image of an optical film by an optical detector. The image is converted into a clean detection image by conducting the following processes: uniforming the brightness, enhancing the contrast, filtering off the noise, smoothing the image and binarizing the image. A relative relation between a pixel and the surrounding pixels of the clean detection image is converted into a spatial relation sequence model. The spatial relation sequence model is compared to the different types of the defect sequence model, so that the defect type of the optical film is identified as a point defect, a lack of material defect or a ripple defect.

10 Claims, 7 Drawing Sheets

OPTICAL FILM DEFECT DETECTION METHOD AND SYSTEM THEREOF

CROSS-REFERENCE TO RELATED APPLICATION

This application claims priority from Taiwan Patent Application No. 104121760, filed on Jul. 3, 2015, in the Taiwan Intellectual Property Office, the content of which is hereby incorporated by reference in their entirety for all purposes.

BACKGROUND OF THE INVENTION

1. Field of the Invention

This application relates to an optical film defect detection method and a system thereof, and more particularly, to an optical film defect detection method and a system thereof which are capable of comparing the defect sequence models aiming at the automatic detection of the manufacturing process of the optical film and the analysis of the detection images to determine the defect type of the optical film.

2. Description of the Related Art

In the various manufacturing processes of the optical film, the products are generally detected in the production line or by the back-end quality control personnel to see whether the manufactured optical film is satisfied with the standards. Although the experienced quality control personnel are capable of distinguishing the defect types and finding out the cause to make an adjustment to the front-end of the manufacturing processes, it is difficult to train such experienced quality control personnel in a short time. What is more, the manual detection method is not time and cost economically, and the determination may vary with the quality control personnel, much less the visual fatigue. Those are the factors causing the errors in the detection.

In order to improve the shortcomings of manual detection, automatic detection devices have been provided to capture the image of the optical film and then the captured image is analyzed to see whether the optical film has defect. Conventionally, the image of the optical film is detected and then the image is compared with the known defective patterns to determine whether the chosen optical film has defect and which defect type is produced. In such case, a computer is applied to perform the automatic detection, the database has to be stored a great amount of defective patterns in advance, such that the detected image can be compared with. However, patterns such as the defect types, positions of defect, directions of defect, and so on are not only similar, but also of tremendousness. It is therefore time-consuming to do the comparison. In addition, an image, which appears for the first time, may be misadjusted due to the micro difference. As a result, the conventional automatic detection method for the optical film is incapable of rapidly and correctly determining the defect types.

In view of this, how to design an optical film defect detection method and a system thereof to increase the efficiency and accuracy of the defection identification in the manufacturing process of the optical film is in dire need towards the manufacturers. Thus, the inventor of the present disclosure has been mulling it over and then designs an optical film defect detection method and a system thereof to aims for improving the existing shortcomings so as to improve the industrial practicability.

SUMMARY OF THE INVENTION

In view of the aforementioned technical problems, the primary objective of the present disclosure provides an optical film defect detection method and a system thereof which aim at resolving the technical problem of lower accuracy of defection identification of the conventional detection identification method.

In according to one objective of the present disclosure, an optical film defect detection method, which may include the following steps: scanning a brightness value of each of lines of an optical film by an optical detector, and calculating a brightness average value of each line, obtaining a brightness weight value corresponding to each line of the optical film and multiplying a plurality of pixels of the optical film and the brightness weight value corresponding to the plurality of pixels of the optical film to form a brightness uniformity image by a processor; detecting the brightness uniformity image by the optical detector to obtain a grey scale value of the plurality of pixels, counting a frequency of occurrence of the grey scale value by the processor, and converting the grey scale value into a grey scale level value corresponding to the grey scale value by a grey scale histogram equalization, so as to form a reinforcement contrast image; finding out the grey scale level value in a peripheral region of the plurality of pixels in the reinforcement contrast image by the processor and replacing the grey scale level value of the plurality of pixels by a morphological opening operation or a morphological closing operation, so as to form a noise filtering image; finding out the grey scale level value in a peripheral region of the plurality of pixels in the noise filtering image by the processor and replacing the grey scale level value of the plurality of pixels by an intermediate value of a sequenced grey scale level value, so as to form a smooth image; comparing the grey scale level value of the plurality of pixels in the smooth image with a threshold value by the processor and dividing the plurality of pixels of the smooth image into a black defective part and a white defect-free part by a binary conversion, so as to form a clean detection image; counting a relative relation between the plurality of pixels and adjacent pixels having a spacing distance in the clean detection image and calculating a characteristic value of the relative relation in different Spacing distances by the processor, so as to form a spatial relation sequence model having the spacing distance and the characteristic value, and comparing the spatial relation sequence model with a defect sequence model stored in a memory by the processor to determine a defect type of the optical film.

Preferably, the defect type may include a point defect, a ripple defect or a lack of material defect.

Preferably, the grey scale histogram equalization may convert the grey scale value of the plurality of pixels by applying the following formula:

$$h(v) = \text{round}\left(\frac{w(v) - w_{min}}{(M \times N) - w_{min}} \times (L-1)\right)$$

wherein, $h(v)$ is a converted grey scale level value, $w(v)$ is the frequency of occurrence of the grey scale value $v$, $w_{min}$ is a minimum frequency of occurrence of the grey scale value, $M \times N$ is a pixel amount of the brightness uniformity images, and $L$ is the grey scale level of an image.

Preferably, the morphological opening operation may use an erosion method to replace the grey scale level value of the plurality pixels by a minimum grey scale level value in the peripheral region of the plurality of pixels and then use a dilation method to replace the grey scale level value of the plurality pixels by a maximum grey scale level value in the peripheral region of the plurality of pixels.

Preferably, the morphological closing operation may use a dilation method to replace the grey scale level value of the plurality pixels by a maximum grey scale level value in the peripheral region of the plurality of pixels and then use an erosion method to replace the grey scale level value of the plurality pixels by a minimum grey scale level value in the peripheral region of the plurality of pixels.

Preferably, the threshold value may derive from the following formula; $T=\text{Min}(q_1(t)\sigma_1^2(t)+q_2(t)\sigma_2^2(t))$ wherein, T is the threshold value; when $q_1(t)$ and $q_2(t)$ apply t as the threshold value, $q_1(t)$ is an average weight of the grey scale level value of a normal pixel and $q_2(t)$ is an average weight of the grey scale level value of a defective pixel; and when $\sigma_1^2(t)$ and $\sigma_2^2(t)$ apply t as the threshold value, $\sigma_1^2(t)$ is a variance of the grey scale level value of the normal and $\sigma_2^2(t)$ is a variance of the grey scale level value of the defective pixel.

Preferably, the relative relation may include a defect-free to defect-free relation, a defect-free to defect relation, a defect to defect-free relation or a defect to defect relation.

Preferably, the characteristic value may derive from the following formula;

$$Z_T(g) = \frac{T(g) - C(g)pq}{\sqrt{C(g)p^2q^2}}$$

wherein, $Z_T(g)$ is the characteristic value; $T(g)$ is a sum of the relative relation with the defect-free to defect-free relation and the defect-free to defect relation when the plurality of pixels in the spacing distance is g; and $C(g)$ is a sum of all the relative relations when the plurality of pixels in the spacing distance is g, p is a proportion to which a defective pixel occupies a gross area, and q is a proportion to which a defect-free pixel occupies the gross area.

Preferably, the spatial relation sequence model and the defect sequence model may be compared by a dynamic time correcting method to thereby identify the defect type of the optical film.

In accordance with another objective of the present disclosure, an optical film defect detection system is provided, which may include an optical detector, a memory and a processor, the processor connects to the optical detector and the memory connects to the optical detector and the processor. The optical detector may detect a brightness value of each of lines of an optical film and a grey scale value of a plurality of pixels of the optical film. The processor may average the brightness value of lines of the optical film to generate a brightness uniformity image and reinforce the grey scale value of the plurality of pixels as a grey scale level value to generate a reinforcement contrast image. The processor filters a noise of the reinforcement contrast image by replacing the grey scale level value by a morphological opening operation or a morphological closing operation to form a noise filtering image, and replacing the grey scale level value by an intermediate value of a sequenced grey scale level value to form a smooth image. The smooth image is divided into a black defective part and a white defect-free part by a binary conversion to form a clean detection image and a relative relation of the clean detection image is counted to form a spatial relation sequence model. The memory may store a defect sequence model. The processor compares the spatial relation sequence model with the defect sequence model to determine a defect type of the optical film.

As mentioned previously, an optical film defect detection method and a system thereof of the present disclosure may have one or more advantages as follows.

1. An optical film defect detection method and a system thereof of the present disclosure are capable of automatically identifying whether an optical film has defects, such that the manual detection time can be reduced to promote the identification speed of defect.

2. An optical film defect detection method and a system thereof of the present disclosure are capable of comparing different defect sequence models by the spatial relation sequence model to determine whether the optical film has a point defect, a lack of material defect or a ripple defect, such that the comparison of historical patterns is unnecessary and the accuracy of identifying the defect types is promoted.

3. An optical film defect detection method and a system thereof of the present disclosure are capable of identifying the defect type correctly according to a uniform standard of defect identification, such that the production line is adjusted in response to the provided defect type so as to promote the yield rate and reduce the probability of defect.

DETAILED DESCRIPTION OF THE PREFERRED EMBODIMENTS

Hereinafter, embodiments of the present disclosure will be described in detail with reference to the accompanying drawings so that those skilled in the art to which the present disclosure pertains can realize the present disclosure. The exemplary embodiments of the present disclosure will be understood more fully from the detailed description given below and from the accompanying drawings of various embodiments of the disclosure, which, however, should not be taken to limit the disclosure to the specific embodiments, but are for explanation and understanding only.

Figure 1:
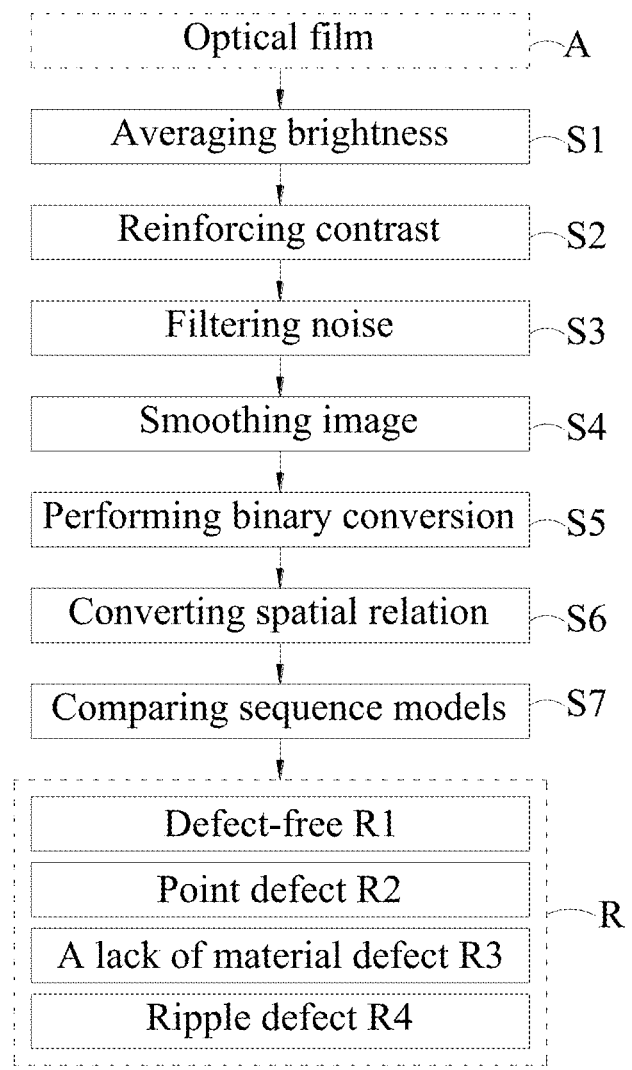
FIG. 1 is a flow chart of an optical film defect detection method of the present disclosure.

Please refer to FIG. 1 which is a flow chart of an optical film defect detection method of the present disclosure. As shown in the figure, the optical film defect detection method of the present disclosure includes the steps S1 to S7. After data of an optical film A derived from an optical detector are input, the processor starts to analyze the data according to the steps S1 to S7 to determine a defect type R of the optical film A, so that the detection result is provided to the production unit to determine whether defective products are produced and to judge the defect types of the defective products. As a result, the production line staff for the operation personnel can adjust the manufacturing machine according to defect type to avoid the same defect. The optical film detected herein is an optical diffusion sheet which is feasible to be applied to a backlight module of TFT-LCD or cover of illumination lamp and is mainly made of plastics, but it shall be not limited thereto. Those films made of optoelectronic material, which have to be detected whether has a defective surface, are all included in an optical film defect detection method of the present disclosure. As to the defect types mainly including a defect-free R1, a point defect R2, a lack of material defect R3 and a ripple defect R4 are going to be detailed in the following identification steps.

Figure 2:
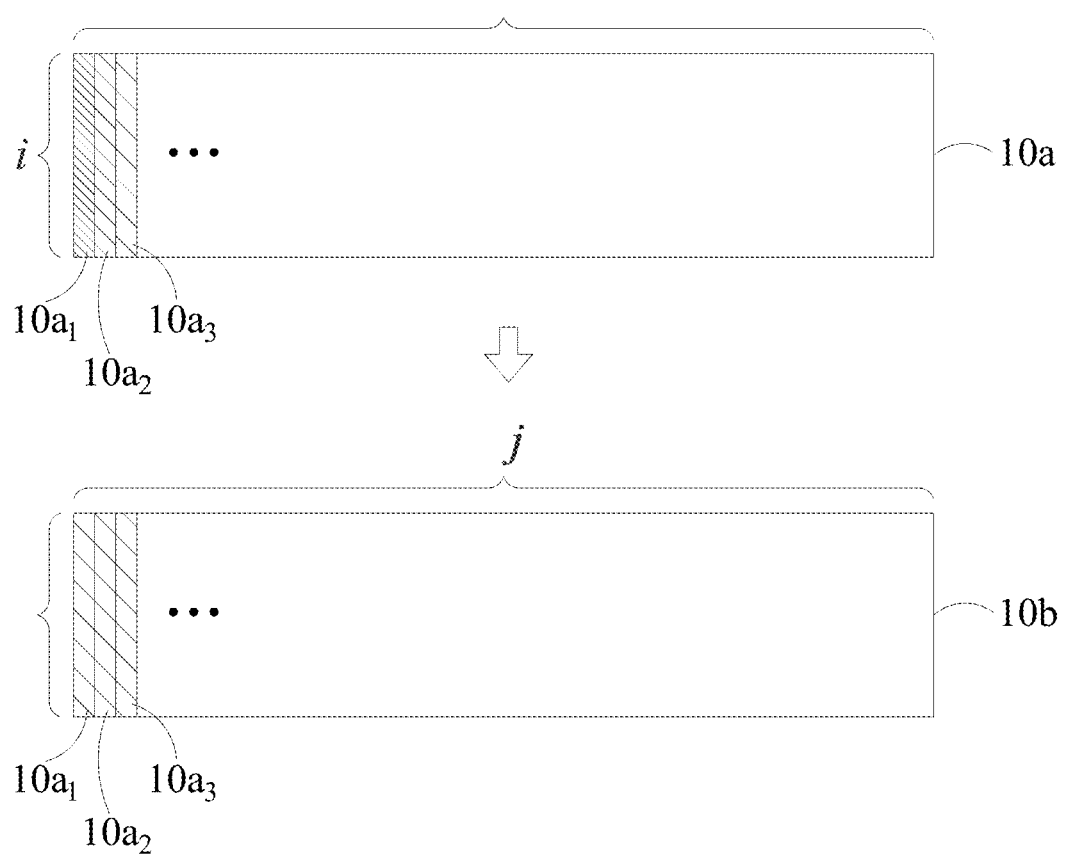
FIG. 2 is a schematic diagram of a brightness average of an optical film defect detection method of the present disclosure.

Step S1: averaging the brightness. A brightness value of each of lines of an optical film is scanned by an optical detector. A brightness average value of each line is calculated for obtaining a brightness weight value corresponding to each line of the optical film and multiplying a plurality of pixels of the optical film and the brightness weight value corresponding to the plurality of pixels of the optical film by a processor, so as to form a brightness uniformity image. Please refer to FIG. 2 which is a schematic diagram of a brightness average of an optical film defect detection method of the present disclosure. As shown in the figure, the optical film may be a longitudinal diffusion sheet and has i×j pixels formed of ith rows and jth lines. When applying the optical detector to detect the surface of the diffusion sheet, the optical detecting devices such as a camera, camcorder, scanner, and so on all have to reply on the light to obtain a clear initial image 10a. However, when the light is disposed in the central region, the longitudinal film as shown in the figure may have a darker block at both ends. For example, a brightness of the pixel column $10a_1$ at the leftmost side is darker than a brightness of the pixel column $10a_2$, and a brightness of the pixel column $10a_2$ is darker than a brightness of the pixel column $10a_3$. Here, a brightness average $Avg_j$ is calculated in the light of each pixel column $10a_1$ to $10a_j$. Each brightness average of each of the pixel columns is calculated to obtain a total brightness average $Avg_{all}$, and the total brightness average $Avg_{all}$ is divided by the brightness average $Avg_j$ of each pixel column to obtain a brightness weight value $\Omega_j$ of each pixel column. Afterwards, each pixel is multiplied with the brightness weight value $\Omega_j$ corresponding to the pixel column to convert the initial image 10a into a brightness average image 10b. Consequently, when analyzing the brightness average image 10b in the follow-up step, it can avoid the misjudgment resulted from the brightness difference out of different blocks.

Figure 3:
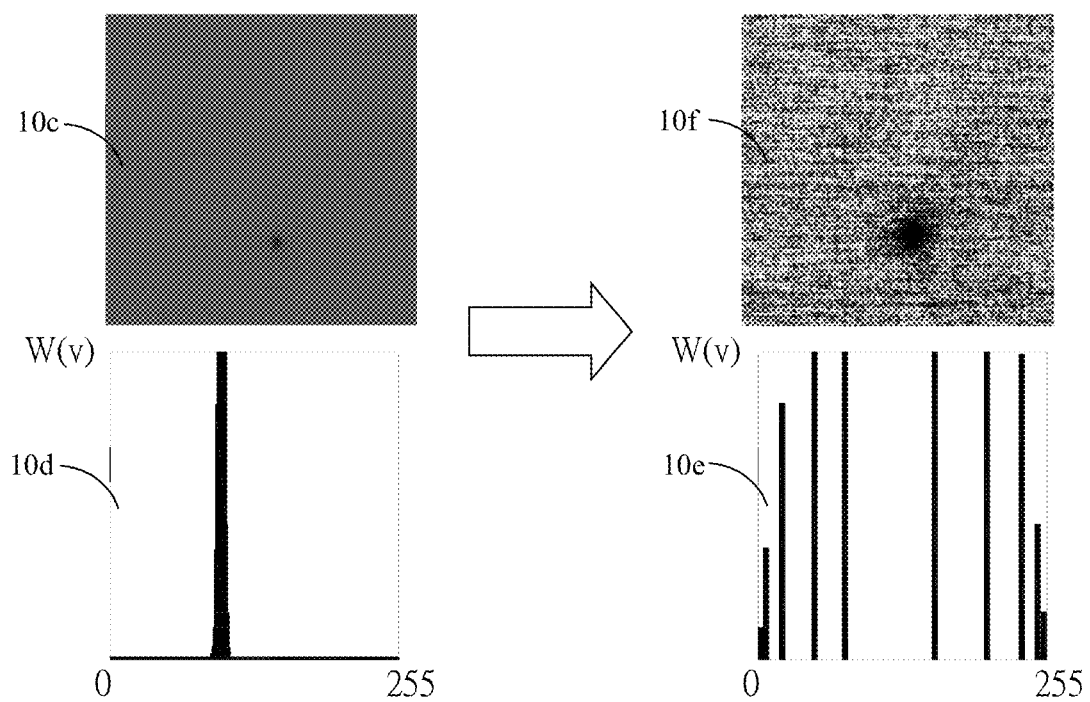
FIG. 3 is a schematic diagram of a reinforcement contrast of an optical film defect detection method of the present disclosure.

Step S2: reinforcing the contrast. The brightness uniformity image is detected by the optical detector to obtain a grey scale value of the plurality of pixels, and a frequency of occurrence of the grey scale value is counted by the processor. The grey scale value is converted into a grey scale level value corresponding to the grey scale value by a grey scale histogram equalization to form a reinforcement contrast. Please refer to FIG. 3 which is a schematic diagram of a reinforcement contrast of an optical film defect detection method of the present disclosure. As shown in the figure, after a brightness of a brightness average image 10c is adjusted in the previous step, the optical detector is applied to obtain the grey scale value of each pixel. However, the defect on the optical film, such as the black spot on the brightness average image 10c and the background have the similar color, and thus, the contrast between the detective part and the normal part has to be reinforced to expose the real defect. In the present embodiment, the grey scale histogram equalization is applied to be deployed to convert the grey scale value of the detection image. As shown in the figure, the frequency w(v) of the detected grey scale value in the initial brightness average image 10c is calculated to obtain the grey scale level histogram 10d. Here, the grey scale image is 8-bit, and the grey scale level is $2^8=256$.

As shown in the figure, the grey scale value of the background is close to that of the defective part, and as a result, the grey scale value in the grey scale level histogram 10d is difficult to be separated as the value is concentrated between 90 and 100. Consequently, the following formula (1) is provided to deploy the background grey scale value and defect grey scale value.

$$h(v) = \text{round}\left(\frac{w(v) - w_{min}}{(M \times N) - w_{min}} \times (L-1)\right) \tag{1}$$

Here, h(v) is a converted grey scale level value, w(v) is the frequency of occurrence of the grey scale value v, $w_{min}$ is the minimum frequency of occurrence of the grey scale value, M×N is the pixel amount of the brightness average image, and L is grey scale level of the image, which is 256 herein. After the conversion, the grey scale value is deployed to form a grey scale level histogram 10e of which contrast has been reinforced. The initial minimum grey scale value 90 is converted into the grey scale level value 0, and the initial maximum grey scale value 100 is converted into the grey scale level value 255. After the initial grey scale value of each pixel is converted into the grey scale level value, it can form a reinforcement contrast image 10f. The reinforcement contrast image 10f can expose the difference between the defect and the background, such that the follow-up analysis for determining whether the pixel is defect-free or defect becomes more accurate.

Step S3: filtering the noise. The grey scale level value in a peripheral region of the plurality of pixels in the reinforcement contrast image is found out by the processor and the grey scale level value Of the plurality of pixels is replaced by a morphological opening operation or a morphological closing operation, so as to form a noise filtering image. After exposing the defect in the aforementioned steps, the unnecessary noise in the initial image is also exposed. In order to avoid the misjudgment, the noise has to be filtered and the only detection object is needed. In the present embodiment, each pixel in the reinforcement contrast image is served as a center of a 3×3 matrix, and the grey scale level value of the surrounding 8 pixels is served a candidate values. The morphological opening operation or the morphological closing operation is applied to replace the grey scale level value of the initial pixel by one of the candidate values to form the image without having noise.

Figure 4:
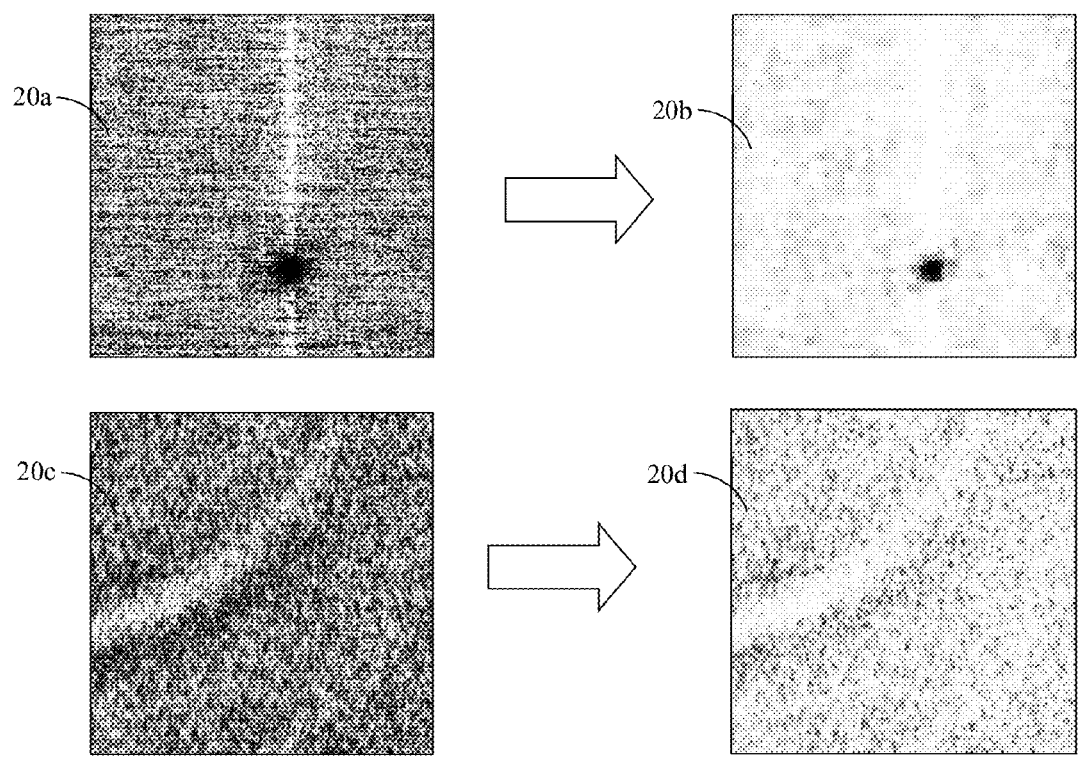
FIG. 4 is a schematic diagram of noise filtering of an optical film defect detection method of the present disclosure.

Please refer to FIG. 4 which is a schematic diagram of noise filtering of an optical film defect detection method of the present disclosure. As shown in the figure, the reinforcement contrast image 20a with the point defect is converted into a noise filtering image 20b by means of the morphological closing operation, and the reinforcement contrast image 20c with the ripple defect is converted into the noise filtering image 20d by means of the morphological opening operation. In the present embodiment, the morphological closing operation means using a dilation method to replace the initial grey scale level value of the pixel by the maximum grey scale level value of the candidate value surrounding each pixel. Such step is repeated by three times, and then an erosion method is used to replace the grey scale level value of the pixel by the minimum grey scale value of the candidate value surrounding each pixel. Conversely, the morphological opening operation is to replace through the erosion method by three times and then through the dilation method by one time. The number of times of the replacements shall be not limited thereto, and it can be adjusted according to the characteristic of the optical film. The dilation method means to reinforce the white region in the image and to replace the black noise, so that only the defective part is left. The corrosion method is feasible to be applied to the defective part with a lighter color or the white ripple, so that the defective part can be exposed more obviously in the corroded white image. As a result, the morphological opening operation fits to the ripple defect, and the morphological opening operation suits to the point defect or a lack of material defect.

Step S4: smoothing the image. The grey scale level value in a peripheral region of the plurality of pixels in the noise filtering image is found out by the processor and the grey scale level value of the plurality of pixels is replaced by an intermediate value of a sequenced grey scale level value, so as to form a smooth image. The noise filtering image derived from the aforementioned step of filtering noise may have a micro noise, so the intermediate value filtering method is applied to further filter the micro noise to form the smooth image. The grey scale level value of the surrounding eight Pixels and the grey scale level value of the pixel are sequenced and then the intermediate value is used to replace the grey scale level value so as to form the smooth image.

Figure 5:
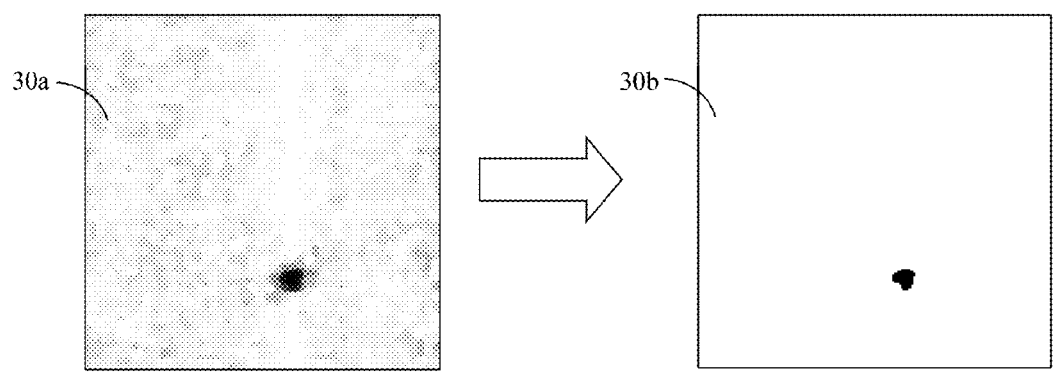
FIG. 5 is a schematic diagram of a binary conversion of an optical film defect detection method of the present disclosure.

Step S5: binary conversion. The grey scale level value of the plurality of pixels in the smooth image is compared with a threshold value by the processor and the smooth image is divided into a black defective part and a white defect-free part by a binary conversion, so as to form a clean detection image. Please refer to FIG. 5 which is a schematic diagram of a binary conversion of an optical film defect detection method of the present disclosure. As shown in the figure, the grey scale level value of each pixel of the smooth image 30a derived from the foregoing steps is compared with the threshold value. If the grey scale level value is smaller than the threshold value, the grey scale level value is converted into zero (white), and if the grey scale level value is greater than or equal to the threshold value, the grey scale level value is converted into 255 (black). Consequently, the clean detection image 30b only having a black defective part and a white defect-free part is obtained.

Conventionally, the threshold value is set as a fixed value, however, the images derived from different time or different machines may be different. So, a dynamic time correcting method is applied in the present embodiment to obtain a better threshold value through the Otsu threshold determination. The method includes the following formula (2).

$$T = \mathrm{Min}(q_1(t)\sigma_1^2(t) + q_2(t)\sigma_2^2(t)) \quad (2)$$

Here, T is the threshold value; when $q_1(t)$ and $q_2(t)$ apply t as the threshold value, $q_1(t)$ is an average weight of the grey scale level value of a normal pixel and $q_2(t)$ is an average weight of the grey scale level value of a defective pixel; and when $\sigma_1^2(t)$ and $\sigma_2^2(t)$ apply t as the threshold value, $\sigma_1^2(t)$ is a variance of the grey scale level value of the normal pixel and $\sigma_2^2(t)$ is a variance of the grey scale level value of the defective pixel. When a great amount of detection image data are input to the system, different values are served as the predetermined threshold value to calculate the variance of two different types of detection image data when the value is served as a reference value. The value, which has the minimum variance, is served as the threshold value to compare with the grey scale level value of the pixel, so as to separate the normal part from the defective part.

Figure 6:
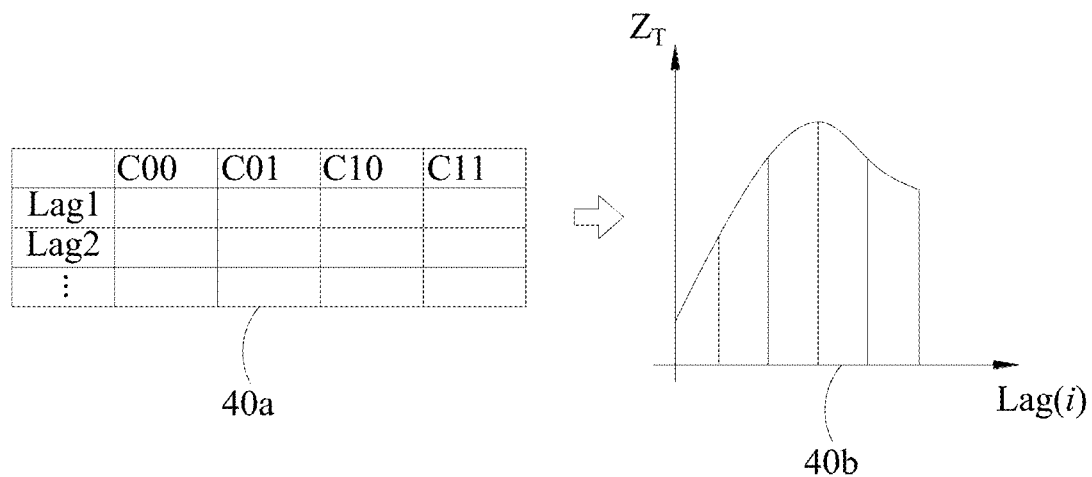
FIG. 6 is a schematic diagram showing the conversion of a spatial relation of an optical film defect detection method of the present disclosure.

Step S6: converting the spatial relation. A relative relation between the plurality of pixels and surrounding pixels having a spacing distance in the clean detection image is counted and a characteristic value of the relative relation in different spacing distances is calculated by the processor, so as to form a spatial relation sequence model having the spacing distance and the characteristic value. Generally, when the clean detection image is obtained, it is compared with the historical data to determine the defect type in the image. However, such comparison method is not time economically and lacking in a better accuracy. In the present embodiment, the spatial relative relation between each pixel and the other pixels is converted into a comparable sequence model, so that the defect type can be determined more rapidly and accurately. Please refer to FIG. 6 which is a schematic diagram showing the conversion of a spatial relation of an optical film defect detection method of the present disclosure. The pixels in the image are converted into a matrix of 0 (normal) and 1 (defect), and the relation between each pixel and the surrounding pixels is calculate by King-move method. As shown in the statistical table 40a, the distance and the frequency of the relative relation between the pixels and the adjacent pixels are counted. Lag 1 denotes the spacing distance is one pixel. Lag 2 denotes the pixel spacing distance is two pixels, and so forth. C00, C01, C10 and C11 respectively indicate the relative relation between a pixel and the surrounding pixels. Here, the relative relation includes a defect-free to defect-free relation (C00), a defect-free to defect relation (C01), a defect to defect-free relation (C10) and a defect to defect relation (C11). The following formula (3) is applied to calculate the characteristic value of the relative relation in different spacing distances.

$$Z_T(g) = \frac{T(g) - C(g)pq}{\sqrt{C(g)p^2q^2}} \quad (3)$$

Here, $Z_T(g)$ is the characteristic value; $T(g)$ is a sum of the relative relation between C00 and C01 when the plurality of pixels in the spacing distance is g; and $C(g)$ is a sum of all the relative relations when the plurality of pixels in the spacing distance is g, p is a proportion to which a defective pixel occupies a gross area and q is a proportion to which a defect-free pixel occupies the gross area. By means of the aforementioned formula, it can calculate the characteristic value of the spatial relative relation in different distances so as to from a spatial relation sequence model 40b having a spacing distance and the characteristic value. As a result, it is favorable to the follow-up comparison.

Step S7: comparing the sequence models. The spatial relation sequence model with a defect sequence model stored in a memory is compared by the processor to determine a defect type of the optical film. When the detection image is converted, the point defect, ripple defect and a lack of material defect respectively have different sequences, and thus, comparing the spatial sequence model derived from each detection image with the defect sequence models of defect types stored in the memory is able to instantly determine whether the detection result is the point defect, ripple defect or a lack of material defect. Consequently, the machine or the parameter of the machine can be set in advance in compliance with different causes of the defect types to avoid the same defect. When comparing, the sequence may deviate as the spatial relation sequence model is set by different machines or different detection parameters. The spatial relation sequence model and the defect sequence model are compared by a dynamic time correcting method to thereby identify the defect type of the optical film.

Figure 7:
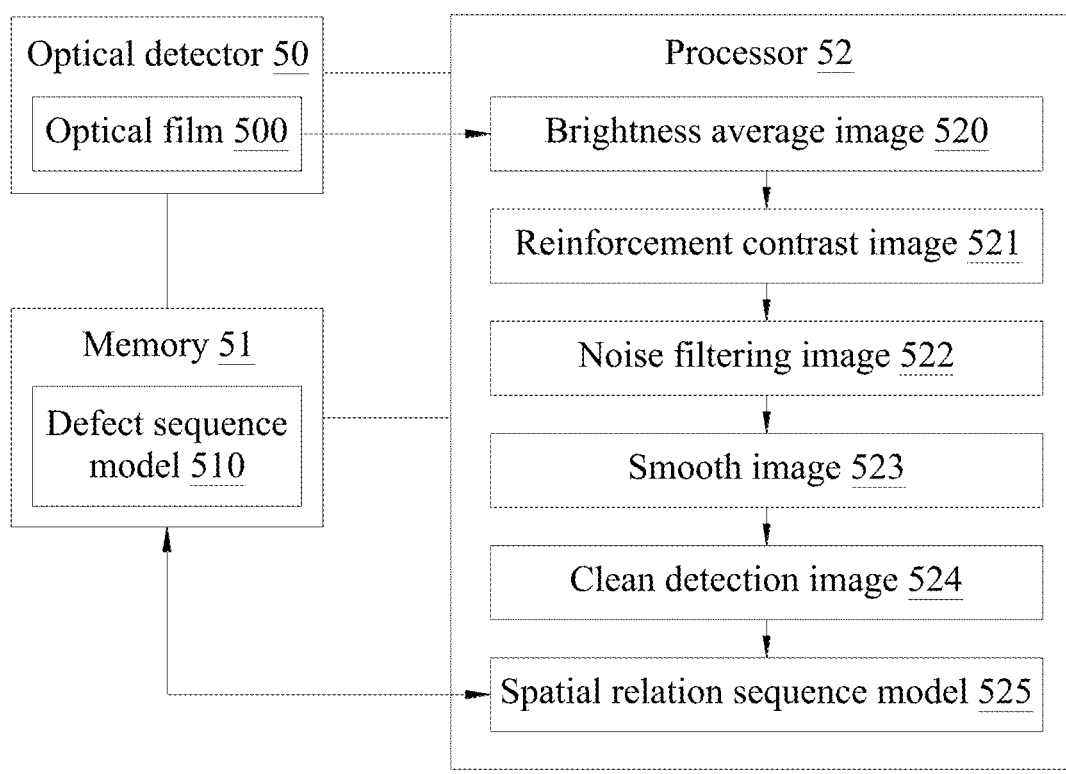
FIG. 7 is a schematic diagram of an optical film defect detection system of the present disclosure.

Please refer to FIG. 7 which is a schematic diagram of an optical film defect detection system of the present disclosure. As shown in the figure, an optical film defect detection system includes an optical detector 50, a memory 51 and a processor 52. Here, the optical detector 50, which is connected to the memory 51, may include the optical detecting devices such as a camera, a camcorder, and so on. The optical detector 50 is applied to detect an optical film 500 to obtain an initial detection image of a surface of the optical film 500. The memory 51 stores a detect sequence model 510 formed by various types of defects, and the detect sequence model 510 is adjusted based on the follow-up detection results after being served as a comparison standard calculated by the historical data, so that the comparison standard can match the actual requirements of the detection. In addition, the memory 51 further stores an algorithm, which is applied to identify the optical film defect, including the optical film defect detection method mentioned in the foregoing embodiments. After obtaining the initial detection image, the processor 52 executes the identification steps according to the algorithm to analyze whether the optical film has defects. Here, the processor 52 applies the step of averaging the brightness to convert the image of the optical film 500 into an brightness average image 520, and then applies the step of reinforcing the contrast to converting the brightness average image 520 into a reinforcement contrast image 521. The two steps are applied to expose the defect of the image. The noise, which is also reinforced in the reinforcement contrast image 521, is formed as a noise filtering image 522 in the step of filtering the noise, and then is further formed as a smooth image 523 in the step of smoothing the image. Afterwards, a grey scale level value of each pixel in the smooth image 523 is compared with a threshold value by the processor 52, and then the image is divided into a clean detection image by means of a binary conversion, that is, an image only having a black defect and a white background. In the step of converting the spatial relation, a clean detection image 524, which has been converted, is applied to convert an image thereof into a spatial relation sequence model 525. Next, the spatial relation sequence model 525 is compared with the defect sequence model 510 stored in the memory 51 to determine the defect types of the optical film 500, such as defect-free, a point defect, a lack of material defect or a ripple defect. The calculation result derived from the processor 52 is displayed by output devices such as LCD, LED, or OLED display screens, and so on, and alternatively, the output devices may be a cable or a wireless internet transmitter, such that the evaluation result can be transmitted to the machine or the operating personnel to notify the staff to make the essential measures according to the defect types. As a result, a better yield rate can obtained and the probability of producing defective product may be decreased.

While the means of specific embodiments in present disclosure has been described by reference drawings, numerous modifications and variations could be made thereto by those skilled in the art without departing from the scope and spirit of the disclosure set forth in the claims. The modifications and variations should in a range limited by the specification of the present disclosure.

What is claimed is:

1. An optical film defect detection method, comprising the following steps:
scanning a brightness value of each of lines of an optical film by an optical detector, and calculating a brightness average value of each line, obtaining a brightness weight value corresponding to each line of the optical film and multiplying a plurality of pixels of the optical film and the brightness weight value corresponding to the plurality of pixels of the optical film to form a brightness uniformity image by a processor;
detecting the brightness uniformity image by the optical detector to obtain a grey scale value of the plurality of pixels, counting a frequency of occurrence of the grey scale value by the processor, and converting the grey scale value into a grey scale level value corresponding to the grey scale value by a grey scale histogram equalization, so as to form a reinforcement contrast image;
finding out the grey scale level value in a peripheral region of the plurality of pixels in the reinforcement contrast image by the processor and replacing the grey scale level value of the plurality of pixels by a morphological opening operation or a morphological closing operation, so as to form a noise filtering image;
finding out the grey scale level value in a peripheral region of the plurality of pixels in the noise filtering image by the processor and replacing the grey scale level value of the plurality of pixels by an intermediate value of a sequenced grey scale level value, so as to form a smooth image;
comparing the grey scale level value of the plurality of pixels in the smooth image with a threshold value by the processor and dividing the plurality of pixels of the smooth image into a black defective part and a white defect-free part by a binary conversion, so as to form a clean detection image;
counting a relative relation between the plurality of pixels and adjacent pixels having a spacing distance in the clean detection image and calculating a characteristic value of the relative relation in different spacing distances by the processor, so as to form a spatial relation sequence model having the spacing distance and the characteristic value, and
comparing the spatial relation sequence model with a defect sequence model stored in a memory by the processor to determine a defect type of the optical film.

2. The optical film defect detection method of claim 1, wherein the defect type comprises a point defect, a ripple defect or a lack of material defect.

3. The optical film defect detection method of claim 1, wherein the grey scale histogram equalization converts the grey scale value of the plurality of pixels by applying the following formula:

$$h(v) = \text{round}\left(\frac{w(v) - w_{min}}{(M \times N) - w_{min}} \times (L - 1)\right)$$

wherein, $h(v)$ is a converted grey scale level value, $w(v)$ is the frequency of occurrence of the grey scale value $v$, $w_{min}$ is a minimum frequency of occurrence of the grey scale value, $M \times N$ is a pixel amount of the brightness uniformity images, and L is the grey scale level of an image.

4. The optical film defect detection method of claim 1, wherein the morphological opening operation uses an erosion method to replace the grey scale level value of the plurality pixels by a minimum grey scale level value in the peripheral region of the plurality of pixels and then uses a dilation method to replace the grey scale level value of the plurality pixels by a maximum grey scale level value in the peripheral region of the plurality of pixels.

5. The optical film defect detection method of claim 1, wherein the morphological closing operation uses a dilation method to replace the grey scale level value of the plurality pixels by a maximum grey scale level value in the peripheral region of the plurality of pixels and then uses an erosion Method to replace the grey scale level value of the plurality pixels by a minimum grey scale level value in the peripheral region of the plurality of pixels.

6. The optical film defect detection method of claim 1, wherein the threshold value derives from the following formula:

$$T=\text{Min}(q_1(t)\sigma_1^2(t)+q_2(t)\sigma_2^2(t))$$

wherein, T is the threshold value; when $q_1(t)$ and $q_2(t)$ apply t as the threshold value, $q_1(t)$ is an average weight of the grey scale level value of a normal pixel and $q_2(t)$ is an average weight of the grey scale level value of a defective pixel; and when $\sigma_1^2(t)$ and $\sigma_2^2(t)$ apply t as the threshold value, $\sigma_1^2(t)$ is a variance of the grey scale level value of the normal pixel and $\sigma_2^2(t)$ is a variance of the grey scale level value of the defective pixel.

7. The optical film defect detection method of claim 1, wherein the relative relation comprises a defect-free to defect-free relation, a defect-free to defect relation, a defect to defect-free relation or a defect to defect relation.

8. The optical film defect detection method of claim 7, wherein the characteristic value derives from the following formula:

$$Z_T(g) = \frac{T(g) - C(g)pq}{\sqrt{C(g)p^2q^2}}$$

wherein, $Z_T(g)$ is the characteristic value; T(g) is a sum of the relative relation with the defect-free to defect-free relation and the defect-free to defect relation when the plurality of pixels in the spacing distance is g; and C(g) is a sum of all the relative relations when the plurality of pixels in the spacing distance is g, p is a proportion to which a defective pixel occupies a gross area, and q is a proportion to which a defect-free pixel occupies the gross area.

9. The optical film defect detection method of claim 1, wherein the spatial relation sequence, model and the defect sequence model are compared by a dynamic time correcting method to thereby identify the defect type of the optical film.

10. An optical film defect detection system, comprising:
an optical detector detecting a brightness value of each of lines of an optical film and a grey scale value of a plurality of pixels of the optical film;
a processor connected to the optical detector, averaging the brightness value of lines of the optical film to generate a brightness uniformity image and reinforcing the grey scale value of the plurality of pixels as a grey scale level value to generate a reinforcement contrast image, the processor filtering a noise of the reinforcement contrast image by replacing the grey scale level value by a morphological opening operation or a morphological closing operation to form a noise filtering image, and replacing the grey scale level value by an intermediate value of a sequenced grey scale level value to form a smooth image, the smooth image is divided into a black defective part and a white defect-free part by a binary conversion to form a clean detection image and a relative relation of the clean detection image is counted to form a spatial relation sequence model; and
a memory connected to the optical detector and the processor, storing a defect sequence model;
wherein the processor compares the spatial relation sequence model with the defect sequence model to determine a defect type of the optical film.

* * * * *